United States Patent [19]
Aiello et al.

[11] Patent Number: 6,104,811
[45] Date of Patent: *Aug. 15, 2000

[54] CRYPTOGRAPHICALLY SECURE PSEUDO-RANDOM BIT GENERATOR FOR FAST AND SECURE ENCRYPTION

[75] Inventors: William Anthony Aiello, Madison; Sivaramakrishnam Rajagopalan, Morris Plains, both of N.J.; Ramarathnam Venkatesan, Redmond, Wash.

[73] Assignee: Telcordia Technologies, Inc., Morristown, N.J.

[*] Notice: This patent is subject to a terminal disclaimer.

[21] Appl. No.: 08/911,690

[22] Filed: Aug. 15, 1997

Related U.S. Application Data

[60] Provisional application No. 60/023,960, Aug. 16, 1996, and provisional application No. 60/035,220, Jan. 8, 1997.

[51] Int. Cl.[7] .................................. H04L 9/00; G06F 1/02
[52] U.S. Cl. ..................................... 380/46; 708/253
[58] Field of Search .................................. 380/28, 44, 45, 380/46, 47; 708/250, 253, 245, 256

[56] References Cited

U.S. PATENT DOCUMENTS

| | | | |
|---|---|---|---|
| 5,148,485 | 9/1992 | Dent | 380/46 |
| 5,251,165 | 10/1993 | James, III | 364/717 |
| 5,420,928 | 5/1995 | Aiello et al. | 380/46 |
| 5,515,307 | 5/1996 | Aiello et al. | 364/717 |
| 5,541,996 | 7/1996 | Ridenour | 380/40 |
| 5,598,154 | 1/1997 | Wilson et al. | 341/50 |
| 5,727,063 | 3/1998 | Aiello et al. | 380/46 |
| 5,892,829 | 4/1999 | Aiello et al. | 380/25 |

Primary Examiner—Gail O. Hayes
Assistant Examiner—Bryan Latham
Attorney, Agent, or Firm—Joseph Giordano

[57] ABSTRACT

A pseudo-random number generator is used as a pre-processing step to generating a long random bit string. The bit string is then "stretched" by performing certain one-way functions in parallel on the bit strings. In a preferred embodiment, specialized constructions based on expander graphs are also used. Preferably, the strings generated by the one-way functions and expander graphs are exclusive-ored. An embodiment may operate in the following manner. Assume a slow but secure generator $G_0$.

1. Using $G_0$, generate random numbers $x_1, x_2, \ldots, x_n$.
2. Using a stretch function, stretch the random numbers into $R = r_1, r_2, \ldots, r_n$ where each $r_i$ is a predetermined amount longer than $x_i$.
3. Use R as a one-time pad for encryption.

This process provides a long, random, cryptographically secure bit string. This bit string is sufficiently fast to support encryption processes suitable for real-time, on-line encryption, such as video stream encryption and TCP/IP layer encryption.

8 Claims, 1 Drawing Sheet

CRYPTOGRAPHICALLY SECURE PSEUDO-RANDOM BIT GENERATOR FOR FAST AND SECURE ENCRYPTION

RELATED APPLICATIONS

This patent application claims the benefit of the following U.S. Provisional Patent applications:

Ser. No. 60/023,960, entitled "An Improved Pseudo-Random Generator" filed on Aug. 16, 1996 for Ramaranthnam Venkatesan; and Ser. No. 60/035,220, entitled "Fast and Secure Encryption" filed on Jan. 8, 1997 for Ramaranthnam Venkatesan.

The contents of these provisional applications are incorporated herein by reference. The subject matter of this patent application is also related to the subject matter of U.S. Pat. No. 5,515,307 entitled "Pseudo-Random Generator", which issued on May 7, 1996 naming William A. Aiello, Sivararnakrishnan Rajagopalan, and Ramaranthnam Venkatesan as inventors. This patent is assigned to Bell Communications Research, Inc., the assignee of this patent application. The content of this patent is incorporated herein by reference.

BACKGROUND OF THE INVENTION

1. Field of the Invention

The present invention is directed to a device and method for providing fast, secure encryption. The fast, secure encryption is provided by an improved cryptographically secure pseudo-random bit generator that quickly provides long, secure, random bit strings.

2. Description of Related Art

The generation of random numbers (or seemingly random numbers, as discussed below) is used in many processes. Processes which use random numbers as auxiliary inputs include sorting, simulation and testing of complex systems, encryption, and other cryptographic processes. Often, high-speed cryptographic applications require a long string of random numbers which cannot be produced quickly enough directly from physical devices.

The "randomness" of the auxiliary input may be quite important to the process. For example, the "randomness" of a random number generator is often important to the security of a cryptosystem. A poor random number generator may cause correlation and reproducibility problems which could allow an adversary to attack a cryptosystem. On the other hand, a perfectly random number generator may not be possible. It is believed that it is impossible to produce a truly random sequence on a computer. This is because data is input into a computer, the computer performs on the data a predictable process for which it has been programmed, and the computer generates a predictable (to someone knowing the process) output.

As a result, pseudo-random sequence generators were developed. A pseudo-random sequence generator provides a very large number of random bits. A pseudo-random generator is sometimes defined as a generator which "looks" random. That is, it passes well-known statistical tests of randomness. A general purpose pseudo-random generator is not suitable for many applications, such as certain cryptography applications. It is important that the generator used for cryptographic applications, for example, is cryptographically secure. This means:

Let the generator be $G(s)=R$, $s \in \{0,1\}^n$, $R \in \{0,1\}^m$, $m > n$; where:

R is a generated random bit string;
s is the seed for the bit string;
n is an integer; and
m is the number of bits in the bit string.

A bit test is then performed in the following manner:

Keeping s secret, one reveals all of R except one bit:
$R=b_1, b_2, \ldots, b_{i+1}, \ldots, b_m$.

Then, for all bits $b_i$, any algorithm having a feasible run time should not be able to guess the unrevealed bit with a probability greater than ½. Of course, one can perform an exhaustive search for the seed s and compute the bit exactly, but that would take an infeasible amount of time. The requirement of being cryptographically strong asks that this exhaustive search is just about the best way to do this attack. That is, in addition to "looking random", as with a general purpose pseudo-random generator discussed above, a "cryptographically secure pseudo-random (CSPR) bit generator" is sometimes defined as being unpredictable. That is, it is computationally infeasible to predict what the next random number will be, even given complete knowledge of the algorithm or hardware generating the sequence and all of the previous bits in the bit string.

In conventional implementations, a CSPR bit generator is a generator which takes a short, random seed as an input, then sequentially repeates a one-way function (such as DES or a one-way hash function) using part of the function output or the entire function output as input for the next iteration. This repeated use of a one-way function produces a long pseudo-random bit string which is indistinguishable from a truly random bit string. (Briefly, a one-way function is a function that is easy to compute but hard to invert on an overwhelming fraction of its range.)

One problem associated with conventional CSPR bit generators described above is experienced in software encryption. Software encryption presents a bottleneck in many real-time applications such as video-stream encryption and TCP/IP layer encryption. A typical attempt to use ciphers like DES for encrypting video on-line software on a work station, for example, results in the video freezing up after a few seconds. This is due to the fact that the additional overhead typically needed to perform the encryption is significant. It is desirable to have an algorithm that adds only such a small overhead that the performance does not change noticeably when encryption is added. Similar comments apply to encryption of packets at the kernel level for Internet applications.

One solution to this problem is to design new encryption algorithms. This solution is impractical. That is because before a new cryptosystem is trusted to be secure, the new algorithm should be studied and attacks to "crack" the cryptosystem should be performed on it. Alternately, one can develop fast algorithms that can be used on any (trusted) existing cipher (as a substitute) in such a way that it is possible to argue that attacking it would imply attacking a trusted cipher or another trusted cryptographic process. An example of a trusted cipher, of course, is DES. It is preferable to avoid dependence on any one particular cipher, however, so that any cipher may be used. As a result, the new algorithm would be just as secure as the one actually used. In this case, one should have the formal argument and its practical implications tested. But the user can avoid more exhausting and expensive cryptanalysis of a new construction.

A second, more practical solution is found in U.S. Pat. No. 5,515,307 ("the '307 patent"), described above. The preferred embodiment of the invention described in the '307 patent uses a slow pseudo-random number generator as a pre-processing step to generating a long random bit string. The device described in the '307 patent works by first producing secure random bits using a slow but strong generator. Then, it "stretches" this string using some specialized constructions based on Random Affine Codes and expander graphs. The '307 patent describes a device which may use any cipher. This device is a random number generator which provides long strings and has provable security properties.

It is an object of the present invention to provide a CSPR bit generator which reduces the bottle neck during software encryption.

It is another object of the present invention to reduce the overhead during encryption.

It is yet another object of the present invention to provide fast, secure encryption using an improved CSPR bit generator.

It is a further object of the present invention to provide a CSPR bit generator using less memory than previous CSPR bit generators.

SUMMARY OF THE INVENTION

These and other objects of the present invention are achieved by a cryptographically secure pseudo-random bit generator according to the present invention. The present invention uses a pseudo-random number generator as a pre-processing step to generating a long random bit string. The bit string is then "stretched" by performing certain one-way functions in parallel on the bit strings. In a preferred embodiment, specialized constructions based on expander graphs are also used. Preferably, the strings generated by the concatenation of the outputs of the one-way functions and by the expander graph processor are exclusive-ored together.

A preferred embodiment operates in the following manner. Assume a slow but secure generator $G_0$.
1. Using $G_0$, generate random numbers $x_1, x_2, \ldots, x_n$.
2. Using a stretch function, stretch the random numbers into $R = r_1, r_2, \ldots, r_n$ where each $r_i$ is a predetermined amount longer than $x_i$.
3. R may be used as a one-time pad for encryption.

This process provides a long, random, cryptographically secure bit string. This bit string is sufficiently fast to support encryption processes suitable for real-time, on-line encryption, such as video stream encryption and TCP/IP layer encryption.

BRIEF DESCRIPTION OF THE DRAWINGS

These and other features of the present invention will be made apparent with reference to the following drawings.

DETAILED DESCRIPTION OF PREFERRED EMBODIMENTS

For clarity of presentation, the invention is described in the following sections:
I. Overview An overview of the operation and structure of the present invention is provided with reference to FIG. 1.
II. The Random Function Processor The random function processor is described with reference to FIG. 2.

III. The Graph Processor and Exclusive-Or Circuit

Figure 1:
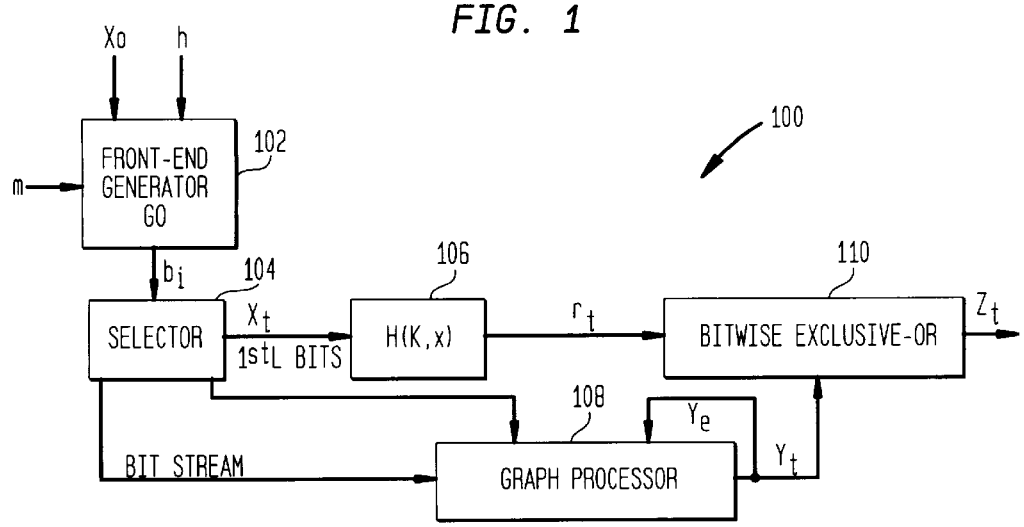
FIG. 1 is a block diagram illustrating a preferred embodiment of a CSPR bit generator according to the present invention.

The graph processor and exclusive-or circuits are briefly described. A second embodiment of the present invention is described with reference to FIG. 3.
IV. Encryption Using the Present Invention An encryption method using a CSPR bit generator according to the present invention is described.
V. Advantages and Implementation of the Present Invention Advantages and implementation issues concerning the present invention are discussed.
VI. Conclusion A conclusion is provided.
I. Overview FIG. 1 is a block diagram of a first preferred embodiment of an improved cryptographically secure pseudo-random bit generator 100 according to the present invention. The device includes a front end generator 102, a selector 104, a random function processor 106, a graph processor 108, and an exclusive-or circuit (XOR) 110. The front end generator 102 receives three inputs: a first seed $x_0$, a second seed h, and a random key m. These inputs are used by the pseudo-random generator 100 to output a random bit string $z_t$.

The generator 100 receives a random bit string $b_i$ from the front end generator 102. The received bits are then "stretched" by processes performed by The random function processor 106 and the graph processor 108. (As discussed below, it is also contemplated that a random bit string suitable for some applications may be generated without use of the graph processor 108.) This "stretching" process provides a larger random bit string than is provided by the front-end generator 102. This generator 100 outputs a long, random, cryptographically secure bit string. This generator 100 is sufficiently fast to support encryption processes suitable for real-time, on-line encryption, such as video stream encryption and TCP/IP layer encryption.

In a preferred embodiment, the stretching is performed by two processes, $P_0$, performed by the random function processor 106, and $P_1$ performed by the graph processor 108. (It is alternatively contemplated that only one process is performed.) The outputs of these processes are XORed together to generate the random bit string $Z_t$.

The process may be summarized as:
1. Using $G_0$, generate random numbers $x_1, x_2, \ldots, x_n$.
2. Using a stretch function, stretch all the random numbers into $R = r_1, r_2, \ldots, r_n$ where each number $r_i$ is a predetermined amount longer than number $x_i$.
3. R may be used as a one-time pad for encryption. R may be exclusive-ored with another bit string to generate $z_t$.

The random bit string $z_t$ is fast and secure, yet the CSPR bit generator 100 uses less memory than the device described in the '307 patent. In a one-time pad application, two parties may share a secret seed of, for example, 64 bits. Applying this seed to the inventive device will generate the same random pad. Thus, a first party may encrypt a message using the inventive device as a CSPR bit generator. The encrypted message may be decrypted by a second party also using the inventive device as a CSPR bit generator by applying the same secret seed to the device.

As seen in FIG. 1, the front-end generator 102 is preferably cryptographically strong and may be a slow but cryptographically secure generator. The front end generator may be, for instance, the front end generator described in the '307 patent. The output of the front end generator is a random bit string $b_i$. (It should be noted that the following discussion is also true for weakly random bits.) The bit string $b_i$ from the front end generator 102 is received by the selector 104. The selector 104 determines the destination of the received bits. Preferably, a first block of L bits are sent to the random function processor 106, a second block of L bits is sent to the graph processor 108, and a bit stream may be sent to the graph processor 108.

The random function processor 106 "stretches" the received block of bits (random number $x_t$) into longer numbers ($r_t$). To avoid repeating random numbers in a relatively short time (i.e., a repeated string about one in every $2^{24}$ strings), the stretched string may be combined with the output of the graph processor 108. The outputs of the random function processor 106 and the graph processor 108 are combined together by an exclusive-or circuit 110. The outputs of the two processors are XORed together. The resultant bit string is $z_t$.

II. The Random Function Processor

Figure 2:
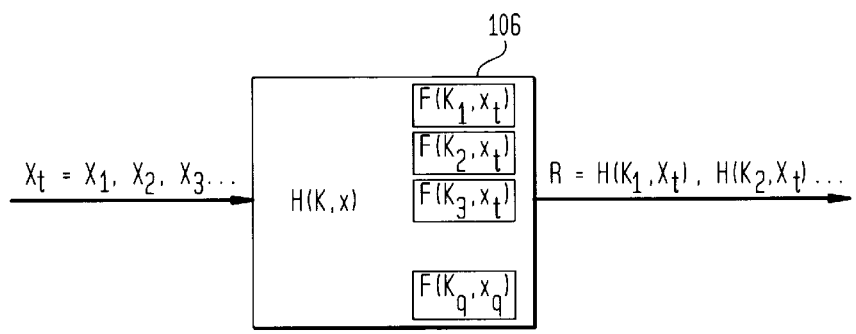
FIG. 2 is a block diagram illustrating the operation of the random function processor.

The present invention includes a simple and practical stretching mechanism, which in comparison to the device described in the '307 patent, requires only about 2 kbits of memory, which is much less than the device in the '307 patent, which used about 0.25 MBytes of memory and yet is comparably efficient. This mechanism is performed by the random function processor 106. The operation of the random function processor 106 is illustrated in FIG. 2.

In a preferred embodiment, the random function processor may operate in the following manner:

1. Let one-way stretching function, H(K,x), denote a cryptographic function that behaves like a random function on inputs "x" with a key "k" being chosen at random. (Suitable cryptographic function includes DES, 3DES, any secure hash function or combination of hash functions, such as MD5, MD4, and SHA.)
2. Let "$K_1, K_2, \ldots, K_r$" be "r" keys, each key of sufficiently large length (e.g., 128 bits).
3. Map the $x_t$ bits into the $R_t$ bits as $H(K_1, x_t)$, $H(K_2, x_t), \ldots, H(K_0, x_t)$.

For illustrative purposes, assume the generator 100 receives a 48 bit long random string by the front end generator 102. This 48 bit string may be stretched into a 256 bit string by computing two different one-way functions in parallel (such as MD4 and MD5) for the same bit string to generate two longer random numbers and concatenating (or appending) the two longer random numbers. For example, 48 bit random number $x_t$ may be stretched as follows: $MD5(x_t) \circ MD4(x_t)$ (here $\circ$ stands for concatenation). Of course, other one-way functions are also suitable for use in the present invention.

Given many 48-bit random numbers $x_1, \ldots, x_n$, each random number may be stretched by this method. As a result, all of the 256 bit strings combined still look random in a formal sense. Note that this property of looking random when one stretches strings is quite different from the collision secure property required of these hash functions when they are used as compression functions.

The stretching function may also stretch the random number x even further.

Let $F_1, F_2, F_3, F_r$ be one-way functions 202 independently picked from a family of functions which satisfy assumption A.5, set out below. Now define g: $\{0,1\}^n \rightarrow \{0,1\}^{4N}$ as follows: $g(x) = F_1(x), F_2(x), F_3(x), F_r(x)$.

This function may be nothing more than a secure hash function with different keys: for example $g(x) = MD5(K_1, x) \circ MD5(K_2, x) \circ MD5(K_3, x) \circ MD5(K_4, x)$. The keys are preferably kept secret. One may wish to use envelope methods. This alternative does not require keeping the code for various functions and will allow some optimization to improve the performance of the implementations. Note that an adversary never gets to evaluate MD5 at an input of his choice. This difference is quite significant because there is no known way to attack a one-way hash function given only its output. In fact, here the adversary does not even know the inputs to MD5; they are random and unknown.

It is contemplated that other functions may also be suitable one-way functions. A suitable one-way function is a function F having parameters (n,N,q), where n is a number of bits in a random number, N is a number of bits in a stretched random number, and q is the modulus and which includes the following properties. Let $x_i$, $i \geq 1$ be a sequence of truly random bits, i.e., produced by a zero-one valued Bernoulli sequence. A stretch function may be defined as:

1 F: $\{0,1\}^n \{0,1\}^N$, N>n,
2 The sequence of outputs $F(x_1), F(x_2), \ldots, F(x_q)$ are indistinguishable from a sequence of random strings of the same length.

How severe are the restrictions on the function? F is far from being a random function and this condition is much milder. To appreciate this, consider the following sequence of assumptions on a secure hash function, some of which are assumed by many researchers.

A.1 F is a fixed function (e.g., SHA, MD5 F(x)=MD5(x)). An adversary makes a query $x_1$, gets the value $F(x_1)$ possibly depending on this value generates the next query $x_2$, sees the value F(x2), and adaptively generates yet another query $x_3$ and so on. The outputs $F(x_1), F(x_2), \ldots, F(x_q)$ are indistinguishable from truly random inputs of the same length.

A.2 F is chosen from a family of functions (e.g., MD5 with a secret key K.F(x)=MD5(K,x)). An adversary makes a query $x_1$, gets the value $F(x_1)$ possibly depending on this value generates the next query $x_2$, sees the value $F(x_2)$, and adaptively generates yet another query $x_3$ and so on. The outputs $F(x_1), F(x_2), \ldots, F(x_q)$ are indistinguishable from truly random inputs of the same length. (Chosen message attack.)

A.3 F is chosen from a family of functions (e.g., MD5 with a secret key K.F(x)=MD5(K,x)). An adversary generates a sequence of queries $x_1, x_2, x_3, \ldots, x_q$ as a batch and then simultaneously queries the values of the function on all these points. The outputs $F(x_1), F(x_1), \ldots, F(_q)$ are indistinguishable from truly random inputs of the same length. (Chosen message attack.)

A.4 F is chosen from a family of functions (e.g., MD5 with a secret key K.F(x)=MD5(K,x)). An adversary uses unbiased coin flips and generates a sequence of random queries $x_1, x_2, x_3, \ldots, x_q$ and as a batch asks for the values of the function on these points. The outputs $F(x_1), F(x_2), \ldots, F(x_q)$ are indistinguishable from truly random inputs of the same length. (Known Random Message Attack.)

A.5 F is chosen from a family of functions e.g., MD5 with a secret key K.F(x)=MD5(K,x). A secret source of unbiased coin flips generates a sequence of random queries $x_1, x_2, x_3, \ldots, x_q$ and the adversary does not know these random queries. The outputs $F(x_1), F(x_1), \ldots, F(x_q)$ are indistinguishable from truly random inputs of the same length. (Random Unknown Message Attack.)

The properties mentioned here are much weaker than the collision resistant property. The function is actually outputting longer sequences (than inputs) and even under a local independence assumption (e.g., two-wise independence) the function is almost everywhere one-to-one and hence collision free for trivial reasons.

The property A.5 is weaker than standard pseudo-random functions. Unlike standard functions, the queries are (a)

random and (b) unknown to the algorithm that distinguishes the function values from truly random strings.

Furthermore, the functions themselves can be chosen in a pseudo-random fashion. In this case, the function itself is varying for every evaluation. Thus, a weakest possible assumption is the security against Weakly Random Unknown Message Attack with varying functions.

III. The Graph Processor and the Exclusive-Or Circuit

The operation of the graph processor 108 and exclusive-or circuit are described in detail in the '307 patent application. These descriptions are incorporated herein by reference.

1. The Graph Processor

The operation of the graph processor is briefly described. The stretching function g performed by the random function processor 106 may not be sufficiently secure if one is concerned with repeat time (e.g., the time in which the bit strings begin to repeat). If random number $x_i$ is a randomly generated sequence $G_0(x_i)$, $i \geq 1$, the stretched numbers are susceptible to a birthday paradox attack in time $2^{n/2}$ rather than $2^{2N}$, because the $x_i$ sequence will repeat in time $^{n/2}2$. (Briefly, the birthday paradox is that it is statistically more likely to find two people with the same random birthday than it is to find one person with a particular birthday.) Having two of the same string helps an adversary "crack" a cryptosystem. This problem may be corrected using random walks in expander graphs. The expander graph based additions avoid any type of statistical attacks which can be performed efficiently on the random function processor.

Assume a slow but perfect or secure front end generator 102 $G_0$ provides a random bit string. Let $x \leftarrow G_0(.)$ denote that x is a number which has been assigned a random string of length $|x|$ by making a call to $G_0$ and obtaining the next block of random bits of appropriate length (i.e., length L as discussed above). Preferably, a d-regular expander graph with $2^L$ nodes is used. Each node is labeled with a L-bit string. Because the graph is d-regular, it can be edge-colored with colors $\{1 \ldots, d\}$. For any node y, $1 \leq r \leq d$, let neighbor (y,r) denote the neighbor of y reached by traversing the edge colored r.

Here moving to a random neighbor involves a shift and an add per word of the machine. The process is described for a node labeled with a, b. Then one either stays at the same node with probability ½ or moves to (a, b+2a) or (a, b−2a) or (a, b+2a+1) or (a, b−2a+1) or (a+2b,b) or (a+2b−1,b) or (a−2b,b) or (a−2b+1,b) at random. The additional time and hardware overhead is minimal: a few shifts and adds per number; the slow down may be ignored. Here all additions are modular, as normally implemented in the standard hardware of machines.

Figure 3:
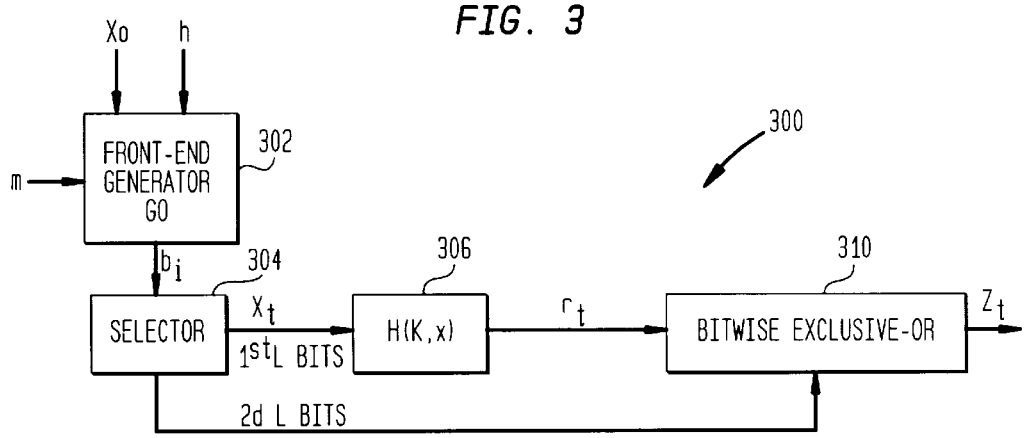
FIG. 3 is a block diagram of a second embodiment of a CSPR according to the present invention.

Alternatively, if one is not concerned with the repeat time of stretching function g, the graph processor may be eliminated from the generator. FIG. 3 is a block diagram of such a pseudo-random bit generator 300. The pseudo-random bit generator 300 has a front-end generator 302, a selector 304, a random function processor 306, and an exclusive-or circuit 55 (XOR) 310. The front end generator 302 receives three inputs: a first seed $x_0$, a second seed h, and a random key m. These inputs are used by the pseudo-random generator 300 to output a random bit string $z_r$.

The front end generator 302 outputs a random bit string $b_i$. The bit string $b_i$ from the front end generator 302 is received by the selector 304. The selector 304 determines the destination of the received bits. Preferably, a first block of L bits is sent to the random function processor 306, and a second block of L bits is sent directly to the XOR circuit 310. The output of the random function processor 306 and the second block of L bits from the selector 304 are combined together by the exclusive-or circuit 310. The two bit strings are XORed together. The resultant bit string is $z_r$.

2. The Exclusive-Or Circuit

The operation of the exclusive-or circuit is briefly described. The overall random bit generation process G includes two sub-processes: $P_0$ (performed by the random function processor 106) and $P_1$ (this optional function is performed by the graph processor 108). Each process produces a sequence of L-bit numbers. To further process the strings, the two strings are processed as follows $r_r \oplus y_r$. Here $\oplus$ stands for bitwise exclusive-or. The output of the exclusive-or circuit is $z_r$. The XOR process permits the output string to inherit the desirable properties of both processes $P_0$ and $P_1$. This random string may be used in applications where long random bit strings are needed quickly. Such applications include real-time applications, for example, video-stream and TCP/IP layer encryption.

IV. Encryption Using the Present Invention

The CSPR bit generator of FIG. 3 (i.e., without the graph processor) may be used to encrypt in the following manner:

1. Let $G_0(s)=x'_1, x'_2, \ldots, x'_m$ be a secure random generator and let $g_k(x)$ be the stretching function described above. In this embodiment, this may be nothing more than several invocations of a one-way function, such as MD5, using a different random hidden key for each invocation.
2. To encrypt a file (in this illustration assume the file is segmented into many blocks of length L), the following is performed. Assume L=4N. Consider the following alternative two cases:
   a. The blocks are not numbered. There are cases in which this is preferred. For example, where each block may be too short. In any case, the encryption is as follows, assuming that the input file F is of appropriate length. Let the next block of the file to be encrypted be $F_i$. Generate the next $x_i$ using G. $R_i:=g(x_i)$. Output $F_i \oplus R_i$.
   b. Each block is assigned a sequence number i, assume that a function, $h(i)=y_i$ is given which randomizes the number i. Then $y_i$ is stretched instead of $x_i$ in case a. above.

The CSPR bit generator of FIG. 1 (i.e., with the graph processor 108) may be used to encrypt in the following manner:

H denotes a one-way function satisfying the randomness conditions mentioned above.

Let $H_1, H_2, H_3, H_4$ denote the one-way functions pre-fixed with different random keys. Now:

for $i: = 1, 2, \ldots$ do $\cdot x'_i \leftarrow G_0(.)$ $P_0$:

$x_i:=H_1(x'_i) \cdot H_2(x'_i) \cdot H_3(x'_i) \cdot H_4(x'_i)$ $P_1$:

$b \leftarrow G_0, b \in \{0,1\}$.

if (b=0) $y_i:=y_i-1$ (stay at the same node)

else $r \leftarrow G_0, r_i \in \{1, \ldots, d\}$, $_iy:=\text{neighbor}_{i-1}(y,r)$ (move to a random neighbor)

Output $z_i:=x_i \oplus y_i$.

V. Advantages and Implementation of the Invention

The present invention has several advantages over prior art CSPR bit generators, even the pseudo-random bit generator described in the '307 patent.

First, from a practical point of view, one-way functions such as MD4 and MD5 are about 10 times faster than DES. Because these one-way functions are so fast, the front end generator 102 may use fairly secure (and presumptively slow) encryption based on DES (or other cipher) and which are as hard to break as DES in a formal sense.

Second, the generator above is sequential. So one would like to make it "random access" in the sense that given a block number, one can compute the random string corresponding to the block number. This is easily accomplished by using a block number as a seed to a secure hash with key or DES.

Implementation issues: Using a block cipher and a secure hash function are considered. The above construction is made with the following things in mind:

HASH FUNCTIONS:

Even recent attacks do not violate the one-way function property of these hash functions. In fact, it seems fair to say that no serious effort has been made to attack this aspect of one-way hash functions. Large Randomness tests have not observed any noticeable discrepancies in the randomness of the behavior of the functions when used as in A.5. We would not depend on their collision-resistant property in any form, but only on their "one-wayness" and randomness to stretch inputs, thus acting almost surely (i.e., on all but a negligible fraction of the inputs) as an infective function rather than as a compression function. This clearly avoids the collision issue, under reasonable assumptions.

CIPHERS:

The randomness properties of a cipher like DES are quite strong.

Performance Issues: The speeds of ciphers are about an order of magnitude smaller than the speeds of hash functions in terms of the number of bits that are processed by them.

The following can be used to speed up the initializing time. Let the input buffer be filled with 512 bits of random bits. Then, the output of MD5 is uniformly distributed in $\{0,1\}^{128}$. Thus, for any value of the internal variable h where h $\in\{0,1\}^{128}$ there exists a 512 bit string x such that MD5 (x)=h.

The CSPR bit generator described here has a comparable speed to the '307 device. The algorithm given here requires much less memory and is more suitable for kernel level applications than previous devices. Both the '307 patent device and the present invention can decrypt in the tens of megabits range. This is an order of magnitude faster than plain DES encryption in some platforms. The exact speeds depend on the platforms and the stretch function used.

VI. Conclusion

Described is an improved cryptographically secure pseudo-random bit generator which quickly provides long bit strings, but uses less memory than previous devices. The bit stings are long enough, fast enough, and secure enough for use in real-time encryption applications and the overhead is small enough for use in kernel level applications.

The above described embodiments of the invention are intended to be illustrative only. Numerous alternative embodiments may be devised by those skilled in the art without departing from the spirit and scope of the following claims.

We claim:

1. Apparatus for generating an output stream of cryptographically strong pseudo-random bits from an input stream of random bits, the apparatus comprising:

means, responsive to the input stream, for forming a first seed from the input stream;

means, responsive to the input stream, for forming a second seed from the input stream;

means, responsive to the input stream, for selecting a set of bits from the input stream;

random function processor circuitry for generating a random function processor bit stream including means for performing a one-way stretching function, said means for performing the one-way stretching function comprising means for performing a plurality of parallel one-way functions to generate a plurality of larger random numbers and means for concatenating the plurality of larger random numbers to generate the random function processor bit stream;

graph processor circuitry for generating a graph processor bit stream including means for performing an expander graph function using the second seed and the set of bits from the input stream; and means, responsive to the random function processor bit stream and the graph processor bit stream, for generating the output stream as the bitwise exclusive-OR of the random function processor bit stream and the graph processor bit stream.

2. A method for generating successive output streams of cryptographically strong pseudo-random bits from an input stream of random bits, the method comprising the steps of:

(a) responsive to the input stream, forming a first seed from the input stream for processing by a random function processor;

(b) responsive to the input stream, forming a second seed from the input stream for processing by a graph processor;

(c) responsive to the input stream, selecting a set of bits from the input stream for processing by the graph processor;

(d) in the random number processor, performing a one-way stretching function, said step of performing the one-way stretching function comprising the steps of performing a plurality of parallel one-way functions to generate a plurality of larger random numbers, and concatenating the larger random numbers to generate a random function processor bit stream;

(e) in the graph processor, performing an expander graph function using the second seed and the set of bits from the input stream to generate a graph processor bit stream;

(f) responsive to the random function processor bit stream and the graph processor bit stream, generating the output stream as the bitwise exclusive-OR of the random function processor bit stream and the graph processor bit stream; and (g) returning to steps (c), (d), (e), and (f) to generate successive output streams.

3. A method for generating an output stream of cryptographically strong pseudo-random bits from an input stream of random bits, the method comprising the steps of:

(a) responsive to the input stream, forming a first seed from the input stream for processing by a random function processor;

(b) responsive to the input stream, forming a second seed from the input stream for processing by a graph processor;

(c) responsive to the input stream, selecting a set of bits from the input stream for processing by the graph processor;

(d) in the random number processor, performing a one-way stretching function, said step of performing the one-way stretching function comprising the steps of performing a plurality of parallel one-way functions to generate a plurality of larger random numbers, and concatenating the larger random numbers to generate a random function processor bit stream;

(e) in the graph processor, performing an expander graph function using the second seed and the set of bits from the input stream to generate a graph processor bit stream; and (f) responsive to the random function processor bit stream and the graph processor bit stream, generating the output stream as the bitwise exclusive-OR of the random function processor bit stream and the graph processor bit stream.

4. The method of claim 3, wherein the plurality of parallel one-way functions are secure hash functions.

5. The method of claim 3 further comprising the step of performing a bitwise exclusive-OR on the output stream and a text stream to provide secure encryption.

6. A method for generating an output stream of cryptographically strong pseudo-random bits from an input stream of random bits, the method comprising the steps of:

(a) responsive to the input stream of random bits, forming a seed from the input stream for processing by a random function processor; and (b) in the random function processor, performing a one-way stretching function on the seed as a first input, said step of performing the one-way stretching function comprising the steps of performing a plurality of one-way functions on the seed using different random numbers as second inputs to generate a plurality of larger random numbers and concatenating the larger random numbers to generate the output stream.

7. The method of claim 6 further comprising the step of performing a bitwise exclusive-OR on the output stream and a text stream to provide secure encryption.

8. The method of claim 6 further comprising repetitively performing step (b) in the random function processor to generate successive output streams.

* * * * *